United States Patent [19]
Crook, Jr.

[11] 3,825,356
[45] July 23, 1974

[54] TWO-PIECE SWAGE FITTINGS

[75] Inventor: Edward J. Crook, Jr., Fort Wayne, Ind.

[73] Assignee: American Hoist & Derrick Company, St. Paul, Minn.

[22] Filed: July 14, 1972

[21] Appl. No.: 271,991

[52] U.S. Cl................................. 403/122, 403/404
[51] Int. Cl............................................ F16g 11/02
[58] Field of Search....... 24/123 E, 123 W, 123 BC, 24/123 R, 129 W, 115 A; 285/261; 287/87; 403/141, 142, 143, 282, 284, 404, 122

[56] References Cited
UNITED STATES PATENTS

| | | | |
|---|---|---|---|
| 66,244 | 7/1867 | Moulton | 24/123 E |
| 1,050,422 | 1/1913 | Birchwood | 403/142 |
| 1,461,033 | 7/1923 | Frieze | 24/123 R |
| 1,829,305 | 10/1931 | Sneed | 403/141 |
| 2,446,542 | 8/1948 | MacInnes | 24/123 W |

FOREIGN PATENTS OR APPLICATIONS

| | | | |
|---|---|---|---|
| 29,546 | 7/1906 | Austria | 24/123 BC |

*Primary Examiner*—Bobby R. Gay
*Assistant Examiner*—Kenneth J. Dorner

[57] ABSTRACT

A two-piece swage socket is made up of interconnected shank and pin receiving sections. The shank section is made of steel having a spheroidize annealed microstructure. One end of this shank section is initially provided with an outwardly open, axially aligned, cylindrical cup portion, while the other end is constituted as an axially aligned, open, hollow cylinder adapted to be cold swaged upon a wire rope. The swage pin receiving section is made of steel having a substantially harder and stronger microstructure, and one end of it is constituted as a part spherical ball portion integrally connected through a narrowed neck either to a pin receiving clevis or tongue end piece at the other end. To make up the swage socket, the ball portion of the pin receiving section is inserted into the cup of the shank section and the outer end region of the cylindrical cup is cold formed onto the ball portion to provide a connection between the shank section and the pin receiving section such that these parts can be rotated and oscillated one with respect to the other.

7 Claims, 6 Drawing Figures

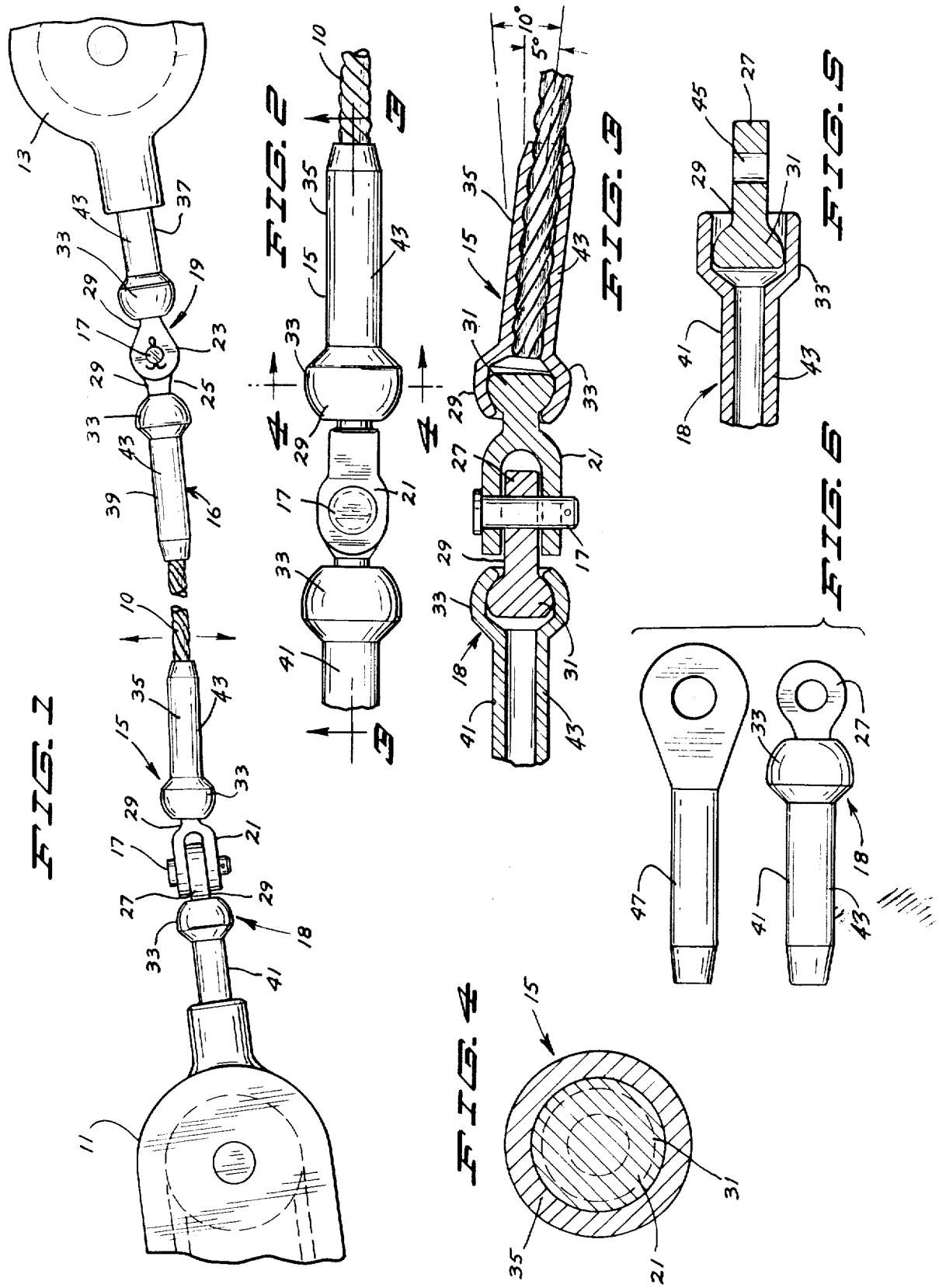

TWO-PIECE SWAGE FITTINGS

BACKGROUND OF THE INVENTION

This invention has relation to swage sockets useful to connect lengths of wire rope to other lengths of wire rope and to fixed connectors, and to other swage fittings to be cold swaged unto wire rope.

At the present time, open clevis and closed tongue swage sockets for connecting wire ropes to each other are typically forged from special bar quality number 1035 carbon steel, suitable for hot forging. The hardness is controlled by annealing to form a spheroidized microstructure suitable for cold swaging the swage socket onto a wire rope. Because of the properties needed to cold swage the fitting to the wire rope and in order that the necessary strength at the clevis or tongue is obtained, it is necessary that the clevis and tongue be designed relatively large, and, therefore, heavy. Under this practice, when socket-rope assemblies, commonly called pendants, are used to support booms on mobile cranes, for example, this appreciable weight of the socket structures actually reduces the effective lifting ability of the crane.

It is known that the clevis and tongue ends of the swage sockets could be designed smaller and still achieve greater strength if those ends were heat treated differently. In other words, if the pin receiving end portions of the swage sockets of the prior art were left hard, a substantial saving in weight and increase in strength could be obtained. If the entire fitting was left hard, however, the shank end of the swage socket could not be satisfactorily cold swaged onto a wire rope. It is known that this could be corrected by annealing only that portion of the fitting which is to be swaged onto the wire rope, but this is a difficult process to accurately control so that the division between the annealed and the hardened portions occurs at the proper place. This is also very expensive due to the time and care needed. The expense is such that this method cannot presently be commercially successful.

Use of a one-piece swage socket fitting has other disadvantages. For example, at the time of swaging such sockets onto opposite ends of a particular piece of wire rope, it is necessary to be aware of and to achieve a proper alignment between the socket at the one end of the rope and the socket at the other end thereof. Otherwise, the sockets either will not fit the mating sockets that they are to be pinned to; or, if the wire rope can be twisted to achieve proper alignment for coupling purposes, there will be excessive internal stresses as the rope is wound tighter or there will be a decrease in strength as the rope is unwound when it is put into use.

In most, or at least many, of the locations for use of wire rope and socket combinations, the wire rope, when working, will tend to whip or swing or otherwise move in a major plane. In order to put the least strain on the rope and socket joints at the point where the rope enters the sockets, it is highly advisable to position the sockets so that the connecting pin will have axis at right angles to the major plane of movement of the wire rope. For example, in the case of boom pendants, that major plane will be vertical and will encompass the entire length of the wire rope. This, of course, necessitates careful alignment of the parts back at the time that the swage sockets are swaged onto the wire rope. It is to be understood that if this alignment is not achieved, there will be undue bending on the wire rope at the point it enters the swage socket shank, and a consequent greatly reduced fatigue life in the wire rope and to the assembly of the wire rope and swage socket(s).

BRIEF SUMMARY OF THE INVENTION

Fittings on the ends of wire rope used to couple the wire rope to other lengths of wire rope or to other structures, fittings (including eyebolts, turnbuckle eyes, shank hooks) and similar working elements, are customarily swaged onto the ends of wire rope. Such fittings are known as swage fittings. Swage fittings made according to the present invention are made in two sections. A first section to be swaged onto the wire rope is called herein the swage shank section, and is characterized by being constituted as a relatively soft steel which has properties suitable for effective swaging onto the wire rope. The other section of the swage fitting is designated herein as the swage working section, and has a relatively harder structure to give the necessary strength to the fitting to allow for an optimum fitting design not having the bulk and weight that would be necessary were the entire swage fitting to have the physical properties necessary to swage it onto the wire rope. In the case of a fitting designed to connect an end of a wire rope to a similar fitting, this swage working section is designated herein as the pin receiving section. One pin receiving section can be formed as a clevis, and the other mating section as a tongue. A ball and cup structure joins the two sections of the fitting. The ball will be constituted as part of the hardened working section integral with, and extending outwardly from, the swage working section or pin receiving section end, while the cup formed around the ball is part of the relatively soft and more easily cold worked swage shank section. For simplicity and clarity of explanation, the two-piece swage fittings will be described as being two-piece swage sockets designed to fasten to similar two-piece swage sockets. To join two ropes together, after the swage sockets have been installed on the ropes, the tongue end piece of one pin receiving section is inserted in the clevis end piece of the other pin receiving section, and a coupling pin is passed through each of the pin receiving sections, pivotally connecting them to each other.

At the point of manufacture, the ball portion of the relatively hard swage pin receiving section is inserted into an open cylindrical outer end cup portion of the softer swage shank section, and the outer end of the cylindrical cup is cold worked down over the harder ball portion to form a ball joint such that the ball can be rotated relative to the cup and can have limited pivotal movement with respect to it in any plane. At this point, the now completed two-piece swage fitting can be shipped to a user for subsequent swaging of a socket of the swage shank section onto a wire rope. This cold working of such swage sockets onto wire rope may occur at the place of rope manufacture or in sling shops or, conceivably, even in the field.

Because of the rotational capability between the interconnected sections of each swage socket fitting, it is not necessary to be concerned with the rotationed alignment of the swage shank section at one end of the wire rope with respect to the alignment of the other swage shank section at the other end of that rope. Any misalignment of the parts at the time they are to be pinned to adjacent fittings is taken care of by the simple expedient of rotating one or both of the balls with respect to its connected shank section.

Furthermore, in the prior art, it was often important to insure that the connecting pin between two adjacent fittings lay with its axis at right angles to the expected plane of maximum movement of the wire rope itself. In the case of the present invention, however, since there can be pivotal movement of the pin receiving section of a swage socket with respect to the pin receiving section thereof, in any direction, it is not necessary to be concerned with the initial alignment of the axis of the connecting pin. If it is thought desirable to provide additional flexibility in angular movement between adjacent wire ropes, or between a wire rope and an adjacent fitting, the two pin receiving sections of the interconnected swage sockets can be rotated after installation to achieve perpendicular alignment between the connection pin and the plane of maximum movement of the connected wire rope(s). In the event that the movement of the ropes with respect to each other is not appreciable, and because of the flexibility of movement of the ball and cup connection between the two parts of each swage socket, this axis of the pivot pin can, in many cases, be safely ignored.

While the ability to force the rotation of the ball with respect to its cup is an important feature of the invention as pointed out above, some frictional resistance to rotation between the ball and cup is also important. The wire rope when subjected to a direct tensile pull type of loading will develop an unlaying moment due to the helix of the wires which form the rope strand and due to the helix of the strands which go together to form the rope. This unlaying moment must be resisted by the end fittings or the rope will unlay and reduce its load carrying capacity. The swaging of the cylindrical cup down over the ball and the design of these parts is such that the frictional resistance due to the tensile pull on the rope exceeds the unlaying moment in the rope by a factor of at least two to one. With the structure of the invention indicated that this ratio holds up even for a well-oiled ball and cup joint.

IN THE DRAWINGS

FIG. 1 is a side elevational view of a wire rope pendant connected by two separate two-piece swage sockets to two adjacent two-piece swage fittings extending outwardly from pulley blocks, with part of the wire rope broken away;

FIG. 2 is a top elevational view of the rope mounted two-piece swage socket and a fragment of a block mounted twopiece swage fitting as seen at the left in FIG. 1;

FIG. 3 is a vertical sectional view taken on the line 3—3 in FIG. 2;

FIG. 4 is a vertical sectional view taken on the line 4—4 in FIG. 2.

FIG. 5 is a sectional view of assembled but unconnected shank and pin receiving sections of a swage socket as seen at the left in FIGS. 2 and 3; and FIG. 6 is a comparative side elevational view of a typical swage socket fitting of the prior art displayed above a typical swage socket fitting of the present invention designed to be swaged to wire of the same size to carry the same load, but being stronger and lighter than the prior art fitting.

DESCRIPTION OF PREFERRED EMBODIMENT

A wire rope 10 has two-piece swage sockets 15 and 16 swaged to it, and each of these swage sockets is connected by a connecting pin 17 to two-piece swage sockets 18 and 19, each of which are fixedly connected to one of the pulley blocks 11 and 13.

As shown, swage sockets 15 and 19 include open (clevis) pin receiving sections 21 and 23 respectively; while swage sockets 16 and 18 include closed (tongue) pin receiving sections 25 and 27, respectively. These sockets 15, 16, 18 and 19 also include shank sections 35, 39, 41 and 37, respectively.

Open and closed pin receiving sections 21, 23, 25 and 27 each include a reduced neck portion 29 integrally connected to a clevis or tongue end piece, and a part spherical ball portion 31 integrally connected to the neck portion 29.

As best seen in FIG. 3, each of the part spherical balls 31 of the pin receiving sections is mounted for rotational movement and limited pivotal movement with respect to a mating cup portion 33 of one of the shank members 35 and 41.

The remainder of each shank member consists of a hollow shank 43 extending integrally outwardly from its cup portion 33.

It is to be understood that swage sockets of the prior art were constituted as unitary articles. That is, the swage sockets which two-piece swage sockets 15 and 16 replace were made of one solid piece of metal from the outer end of the shank, which was swaged onto the wire rope, to the innermost end of the open (clevis) and closed (tongue) swage socket pin receiving members. This meant that the entire chemistry and composition of the swage socket had to be such that the shank portion of the socket was suitable to be cold worked or swaged onto the wire rope. Also, the microstructure of this fitting had to be amenable to cold working or swaging. This meant that a special bar quality 1035 carbon steel or the like had to be used and that the hardness of the shank portion had to be controlled by annealing to form a spheroidized microstructure suitable for cold swaging. Typically the entire swage fitting was so annealed, and this process left an inherent lack of strength in the pin receiving end portion of the fitting such that the bulk of these pin receiving end portions had to be greatly increased in size over that which could be used if the steel was in its hardest condition.

Another way to solve this dilemma between the need for hardened steel in the pin receiving socket portion and the softened or annealed microstructure in the swaged portion was to selectively anneal just the shank portion of the fitting. As pointed out above, this method is so difficult to perform, needed such precision of controls, and was so expensive, that it has not been commercially successful.

In the case of the two-piece swage sockets or fittings of the present invention, however, the shank sections are made by annealing to form a spheroidized microstructure suitable for cold swaging both onto a wire rope and also onto the part spherical ball of the pin receiving section, while the working section is hardened for increasing strength.

Many different formulations of materials and treatments can be utilized to accomplish the results of the invention, but it has been found that a pin receiving section utilizing a number 4130 alloy steel heat treated to 269–302 Brinell hardness number (BHN) with an approximate yield strength of 90,000 pounds per square inch (PSI) has been very satisfactory; as has a shank section also made of number 4130 alloy steel but which has been annealed to have a spheroidized microstructure and a Brinell hardness number of no more than 163.

This compares with the present sockets which are, as pointed out above, made of a number 1035 carbon steel spheroidize annealed to 163 BHN maximum with an approximate yield strength of only 50,000 PSI.

This difference in material strength has allowed the design of two-piece swage sockets utilizing smaller sections and pin sizes, while still retaining at least 25 percent additional strength over the one-piece sockets made of number 1035 steel. A visual comparison of a comparable fitting 47 of the prior art and of the present invention is presented in FIG. 6. This additional strength has been designed into the socket to make it compatible with premium grades of wire rope presently being marketed, with sufficient reserve for any further upgrading of the strength of wire rope in the future.

An approximate 16 percent reduction in weight is achieved by utilization of the structure of the present invention and use of the alloy material heat treated as opposed to the use of number 1035 carbon steel.

As seen in FIG. 3, each ball and cup joint permits the shank section to swing 5° from the aligned position with respect to the pin section, thus giving a maximum angle of oscillation of ten degrees.

The shank section of each swage socket, being entirely spheroidize annealed, cannot only be swaged onto the wire rope in the usual manner, but also is easily formed around the ball to provide the rotatable and oscillating joint. In FIG. 5, the relationsip of a typical part spherical ball portion 31, shown as part of pin receiving section 27, with respect to a typical cup portion 33, shown as part of shank 41, before the parts are fastened together is shown in FIG. 5. With the parts so related, at the time of the manufacture of the two-piece swage socket, the outer, initially cylindrical, ends of the cup 33 are cold formed down onto the ball 31 to position as seen in FIG. 3.

The embodiments of the invention in which an exclusive property or privilege is claimed are defined as follows:

1. A swage fitting for connecting a wire rope to a working element to be permanently rotatably and pivotally supported with respect to said element, said fitting including:
   A. a hollow shank section of material suitable for cold swaging onto a wire rope, said shank section being provided with:
      1. a hollow shank portion adapted to receive a wire rope; and
      2. a cup portion integral with and axially aligned with the axis of said shank portion;
   B. a working section of material which is substantially harder and stronger than the material of the shank section and including a part spherical ball portion having an exterior surface generally corresponding to the interior surface of said cup portion, said ball portion thereby permanently rotatably and pivotally supported within said cup portion; and
   C. means cooperating with said working section for connecting said working section to said working element.

2. The combination as specified in claim 1 wherein said shank section is made of steel which has been annealed to provide a spheroidize annealed microstructure.

3. The combination as specified in claim 2 wherein said working section is made of steel which has been heat treated to attain substantially greater hardness and strength than that of the steel in the shank section.

4. The combination as specified in claim 3 wherein the chemical composition of the steel in both sections is the same.

5. The combination as specified in claim 3 wherein said shank section is heat treated annealed to have a Brinell hardness number of not over 163 maximum.

6. The combination as specified in claim 5 wherein the working section is heat treated to have a Brinell hardness number of between 267 and 302.

7. The combination as specified in claim 3 wherein said shank section is constituted as an alloy steel from the group including the AISI type 3100 series, the 4000 series, the 4100 series, the 4300 series, the 4600 series, the 4700 series and the 4800 series.

* * * * *